United States Patent [19]
Takahashi et al.

[11] Patent Number: 6,067,703
[45] Date of Patent: May 30, 2000

[54] METHOD FOR FABRICATING A COMBINED THIN FILM MAGNETIC HEAD

[75] Inventors: Seiichirou Takahashi, Nara; Junichi Sano, Ohgaki; Fumio Tatezono, Hirakata, all of Japan

[73] Assignee: Sanyo Electric Co., Ltd., Moriguchi, Japan

[21] Appl. No.: 09/033,803

[22] Filed: Mar. 3, 1998

[30] Foreign Application Priority Data

Mar. 3, 1997 [JP] Japan ..................................... 9-047976

[51] Int. Cl.[7] ............................ G11B 5/127; G11B 5/187
[52] U.S. Cl. ..................................... 29/603.13; 29/603.14; 29/603.15; 29/603.18; 360/113; 427/130
[58] Field of Search ........................... 29/603.15, 603.13, 29/603.14, 603.11, 603.2, 603.18; 360/113, 121; 216/22, 66; 427/130, 131

[56] References Cited

U.S. PATENT DOCUMENTS

| | | | |
|---|---|---|---|
| 3,908,194 | 9/1975 | Romankiw | 360/113 |
| 4,405,959 | 9/1983 | Chabrolle | 360/119 |
| 4,803,580 | 2/1989 | Mowry | 360/113 |
| 4,992,901 | 2/1991 | Keel et al. | 29/603.15 |
| 5,079,662 | 1/1992 | Kawakami et al. | 360/113 |
| 5,116,719 | 5/1992 | Gau | 29/603.15 |
| 5,438,747 | 8/1995 | Krounbi et al. | 29/603.15 |
| 5,804,085 | 9/1998 | Wu et al. | 216/22 |
| 5,867,890 | 2/1999 | Hsiao et al. | 29/603.14 |
| 5,874,010 | 2/1999 | Tao et al. | 216/66 |
| 5,901,432 | 5/1999 | Armstrong et al. | 29/603.14 |

FOREIGN PATENT DOCUMENTS 2064908  3/1990  Japan .

*Primary Examiner*—Lee Young
*Assistant Examiner*—A. Dexter Tugbang
*Attorney, Agent, or Firm*—W. F. Fasse; W. G. Fasse

[57] ABSTRACT

A combined thin film magnetic head includes a magnetoresistive reproducing head part and an inductive recording head part. The magnetoresistive reproducing head part is defined between a lower shielding layer and a merged core layer. The inductive recording head part is defined between the merged core layer and an upper core layer and is configured to specify a track width for the recording head part by providing the upper core layer in a localized region $W_2$. A method of fabricating the magnetic head includes steps of forming an etching-protective layer on a gap layer so as to provide an exposed region $W_1$ left uncovered which is larger than the localized region $W_2$ in which the upper core layer is to be finally confined, depositing the upper core layer over the entire surfaces thereof, and etching the upper core layer so as to finally confine the etched upper core layer in the localized region $W_2$. In a preliminary process, the merged core layer is formed to have an elevated part at a location corresponding to the localized region, and an insulating layer is deposited around the elevated part of the merged core layer, before the gap layer is deposited entirely over the elevated part and the localized region.

14 Claims, 8 Drawing Sheets

METHOD FOR FABRICATING A COMBINED THIN FILM MAGNETIC HEAD

BACKGROUND OF THE INVENTION

1. Field of the Invention

The present invention relates to a combined thin film magnetic head provided with a magnetoresistive reproducing head part and an inductive recording head part, and particularly to a method for fabricating such a magnetic head.

2. Description of Related Art

A magnetoresistive element is an element which has a high sensitivity sufficient to precisely detect changes in an external magnetic field through the magnetic resistance changes therein. In view of such a nature, efforts have been made to investigate its application to a reproducing magnetic head for reading information stored in a magnetic recording medium such as a hard disk. However, such a magnetoresistive element is solely applicable to the reproducing head. Accordingly, other efforts have been made to investigate a recording/reproducing magnetic head applicable to hard disks, i.e. a combined thin film magnetic head which combines a reproducing head comprising the magnetoresistive element with a recording head comprising an inductive thin film magnetic head.

Such a combined thin film magnetic head is generally constructed by forming a magnetoresistive reproducing head part on a substrate and thereafter forming an inductive recording head part thereon. The magnetoresistive reproducing head part is magnetically shielded by upper and lower shielding layers. The inductive recording head part has upper and lower core layers which extend in parallel to pass centrally through a coil formed of a thin film. One end of the upper core layer is connected to a corresponding end of the lower core layer. Another end of the upper core layer is spaced from a corresponding end of the lower core layer to define therebetween a gap for constituting a detection region. In general, the combined thin film magnetic head incorporates a single magnetic layer for constituting the upper shielding layer for the reproducing head part as well as the lower core layer for the recording head part, i.e., the single magnetic layer serves as the shielding layer and also as the lower core layer. Such a magnetic layer serving as the shielding layer and also as the lower core layer is referred to as a "merged core" throughout the specification of the present application.

A track width in the reproducing head part is generally specified by a distance between electrodes for passing a detection current through the magnetoresistive element. On the other hand, a track width in the recording head part is specified by a length of a gap defined between distal ends respectively of the merged core and upper core layers, and generally by the localized provision of the upper core layer. Accordingly, subsequent to deposition of the upper core layer over an entire surface of an underlying layer, the upper core layer portion deposited outside the localized region must be completely removed such as by etching, that is, the etching needs to reach completely to a surface of a gap layer defined between the merged core layer and the upper core layer to remove the upper core layer from the region outside the localized region. Since the film thickness of the gap layer is very small, it has been necessary to carry out successive partial etching steps for etching the merged core layer, serving as the lower core layer. Intentionally etching an upper portion of the merged core layer to a width equal to the gap length has been also suggested to control a magnetic field to be produced in the gap.

However, etching the merged core layer, if over only partly, undesirably impairs its function as the upper shielding layer. Furthermore, the recent demand for higher magnetic density recording requires a smaller gap length, and accordingly a narrower track width. It is therefore desired to provide a method wherein the track width can be defined with precision by the selective etching which stops at the gap layer and leaves the merged core layer unetched.

SUMMARY OF THE INVENTION

It is an object of the present invention to provide a method for fabricating a combined thin film magnetic head which is able to avoid impairing the function of the merged core layer as the upper shielding layer, and which enables the localized provision of the upper core layer to thereby precisely define the track width for the recording head part.

In accordance with a first aspect of the present invention, there is provided a method for fabricating a combined thin film magnetic head which includes a magnetoresistive reproducing head part and an inductive recording head part, wherein the magnetoresistive reproducing head part is defined between a lower shielding layer and a merged core layer, and wherein the inductive recording head part is defined between the merged core layer and an upper core layer and is configured to specify a track width for the recording head part by providing the upper core layer in a localized region. The method characteristically includes the steps of forming a gap layer on the merged core layer for defining a gap for the recording head part, forming an etching-protective layer on the gap layer to provide an exposed region which is left uncovered and which is more extensive than a localized region in which the upper core layer is finally to be confined, and depositing the upper core layer over entire surfaces of the etching-protective layer and the exposed region, i.e. the gap layer portion left uncovered by the etching-protective layer. The method further includes the step of etching the upper core layer outside the localized region to finally confine the remaining etched upper core layer in the localized region for defining a desired track width for the combined thin film magnetic head.

In accordance with a second aspect of the present invention, there is provided a method for fabricating a combined thin film magnetic head which includes a magnetoresistive reproducing head part and an inductive recording head part, wherein the magnetoresistive reproducing head part is defined between a lower shielding layer and a merged core layer, and wherein the inductive recording head part is defined between the merged core layer and an upper core layer and is configured to specify a track width for the recording head part by providing the upper core layer in a localized region. Characteristically, the method according to the second aspect includes the steps of forming an elevated portion on the merged core layer in a region corresponding to the localized region in which the upper core layer is to be finally confined, and forming an insulative layer on the merged core layer subsequent to removal of the resist layer to bring its surface in general alignment with a surface of the elevated portion. The method of the second aspect further includes the steps of depositing a gap layer over entire surfaces of the elevated portion of the merged core layer and the insulative layer for constituting a gap for the inductive recording head part, forming an etching-protective layer on the gap layer to provide an exposed region which is left uncovered and which is more extensive than the localized region for the upper core layer, and depositing the upper core layer over entire surfaces of the etching-protective layer and the exposed region, i.e. the gap layer portion left uncovered by the etching-protective layer. The method of the second aspect further includes the step of etching the upper core layer outside the localized region to finally confine the remaining etched upper core layer in the localized region for defining a desired track width for the combined thin film magnetic head.

In one embodiment of the second aspect, the elevated portion forming step includes the steps of forming a resist layer on the merged core layer to extend over a region corresponding to the localized region in which the upper core layer is finally to be confined, and etching the merged core layer in a region left uncovered by the resist layer while using the resist layer as a mask.

In accordance with the second aspect of the present invention, a magnetic flux leakage from the track can be suppressed.

In the present invention, the etching-protective layer is formed on the gap layer so as to provide an exposed region left uncovered which is more extensive than the localized region for the upper core layer, for the purpose of protecting the merged core layer from the etching action to be applied for removing the upper core layer from the region outside the localized region. It is accordingly preferred that the etching-protective layer is formed of material whose etch rate is much slower than the upper core layer etch rate. Specifically, the etching-protective layer is preferably formed of alumina, diamond-like carbon (DLC), SiC, or BN.

A film thickness of the etching-protective layer is preferably in the range of 1.0 µm–2.0 µm. If the film thickness becomes excessively small, the etching-protective layer more likely fails to attain its protective purpose, i.e., the merged core layer located therebelow may possibly be etched. On the other hand, if it becomes thicker than necessary, the forming time of the etching-protective layer is simply prolonged while a further improvement of the protective effect is unattainable. This inefficiency leads to an economical disadvantage. Also, the excessively increased film thickness of the etching-protective layer tends to cause increased undulation in the upper core layer formed thereon so that the use of a lithography process becomes impossible. Moreover, a total thickness of the thin film magnetic head is unnecessarily increased.

In the present invention, the etching-protective layer is formed on the gap layer so as to provide the exposed region left uncovered which is more extensive than the localized region for the upper core layer. The exposed or uncovered region extends outwardly in opposite directions from a boundary of the localized region. The uncovered region is wider than the localized region, for example, by a dimension of not less than 0.2 µm, more preferably in the range of 0.2 µm–3.0 µm. If the dimension falls below 0.2 µm, the etching-protective layer may possibly penetrate into the gap part. If it goes beyond 3.0 µm, the merged core layer may possibly be etched. Thus, when the etching-protective layer is formed on the gap layer as to provide the exposed region left uncovered which is more extensive than the localized region for the upper core layer, its penetration into the gap part is prevented to result in formation of the gap for the recording head part with increased precision.

In accordance with the present invention, the provision of the etching-protective layer prevents the merged core layer from being etched during the process of etching the upper core layer. Therefore, the gap length in the gap part, that is, the track width can be precisely defined, without impairing the function of the merged core layer as the upper shielding layer.

In accordance with one preferred embodiment of the present invention, etching is carried out with an oblique incident ion beam at its initial stage and with a perpendicular incident ion beam at its final stage. The use of the oblique incident ion beam at the etching initial stage restrains the etched upper core layer material from redepositing on the resist layer used to protect the upper core layer portion located in the localized region from the etching action. The redeposition of the etched upper core layer material on the resist layer increases the width of the resist layer and thereby changes a pattern to be etched. In a particular case where the localized region for the upper core layer is to be made narrower to gain a narrower track, such a redeposition of the etched upper core layer material on the resist layer becomes problematic. For example, in the case where the redeposition of etched upper core layer material onto the resist layer is estimated as being large in amount, the resist layer must have a width of 0.5 µm or less in order to obtain the etched upper core layer defining a track width of 3 µm or less. The inventors of the present application have acknowledged from experience that the width of the resist layer may be reduced to about 1 µm when desired to provide the etched upper core layer defining a track width of about 3 µm, provided that etching is carried out by the oblique incident ion beam which is incident at an incident angle ranging from 20° to 30° relative to a plane generally normal to the gap layer.

The successive etching with such an oblique incident ion beam may possibly produce undercuts in a lower portion of the upper core layer. It is thus preferred that the oblique incident ion beam etching is switched to the perpendicular incident ion beam etching at a final stage of the etching process. A preferred timing for switching is when 80%–95% in thickness of the upper core layer is etched. If it is below 80%, the redeposition tends to become larger in amount. If it goes beyond 95%, the merged core layer may possibly be etched.

As described above, when the oblique incident ion beam etching is carried out at the initial stage of the etching precess and the perpendicular incident ion beam etching is carried out at the final stage of the etching process, the redeposition of the etched upper core layer material on the resist layer is effectively prevented. Also, such a control prevents the etching from causing undercuts in the lower portion of the upper core layer, so that the upper core layer can be precisely etched to define an intended track width.

DESCRIPTION OF THE PREFERRED EMBODIMENTS

Figure 1A:
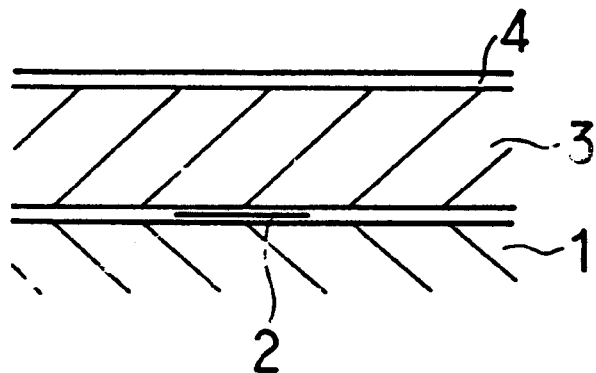
FIGS. 1A–1C are schematic cross-sectional views respectively showing fabricating processes in accordance with a first embodiment of the present invention.
Figure 1B:
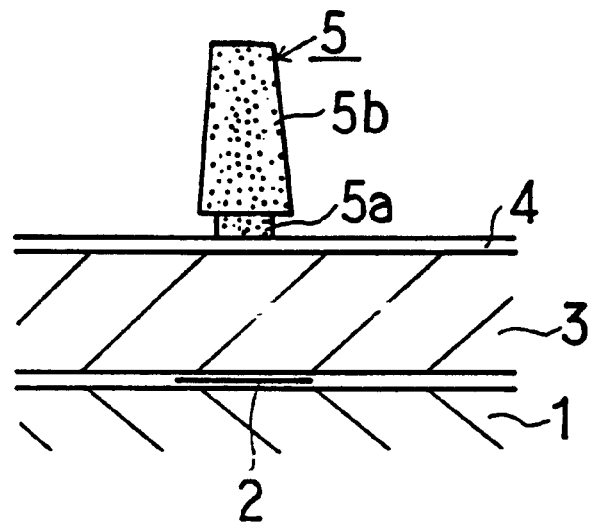
Figure 1C:
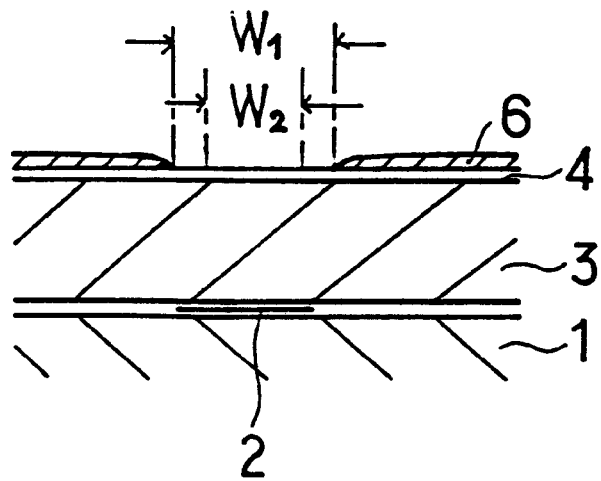
Figure 2D:
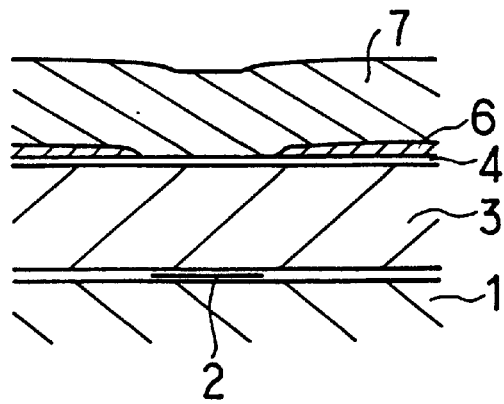
FIGS. 2D–2F are schematic cross-sectional views respectively showing further fabricating processes in accordance with the first embodiment of the present invention.
Figure 2E:
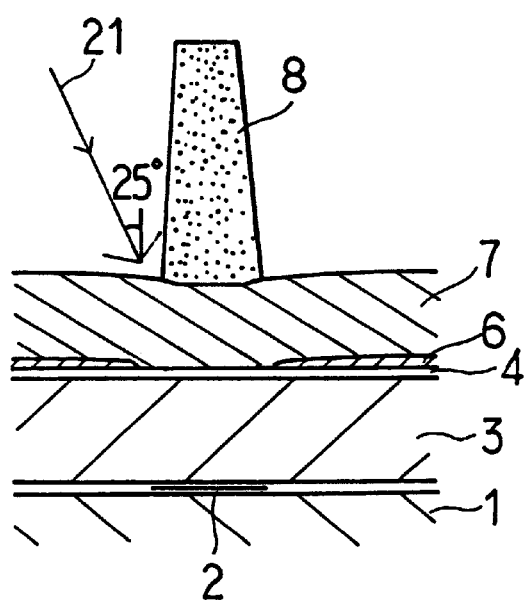
Figure 2F:
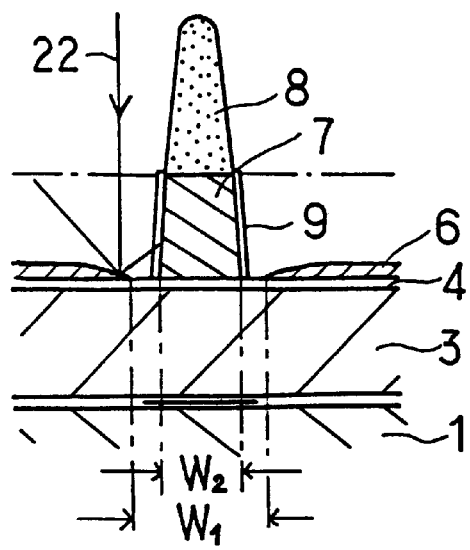

FIGS. 1A–1C, as well as FIGS. 2D–2F, are schematic cross-sectional views, respectively, which illustrate one exemplary series of processes embodying a first method for fabricating the combined thin film magnetic head in accordance with the present invention.

Referring now to FIG. 1A, a magnetoresistive (hereinafter referred to as MR) reproduction or read head part is constructed by interposing an MR film 2 between a lower shielding layer 1 and a merged core layer 3 serving as an upper shielding layer. The lower shielding layer 1 is formed on a nonmagnetic substrate (not shown). In this particular embodiment, the lower shielding layer 1 and the merged core layer 3 are comprised of NiFe (permalloy). Formed on the merged core layer 3 is a gap layer 4 (alumina of 0.3–0.4 $\mu$m film thickness) which serves as a gap for an inductive recording head part.

Figure 3:
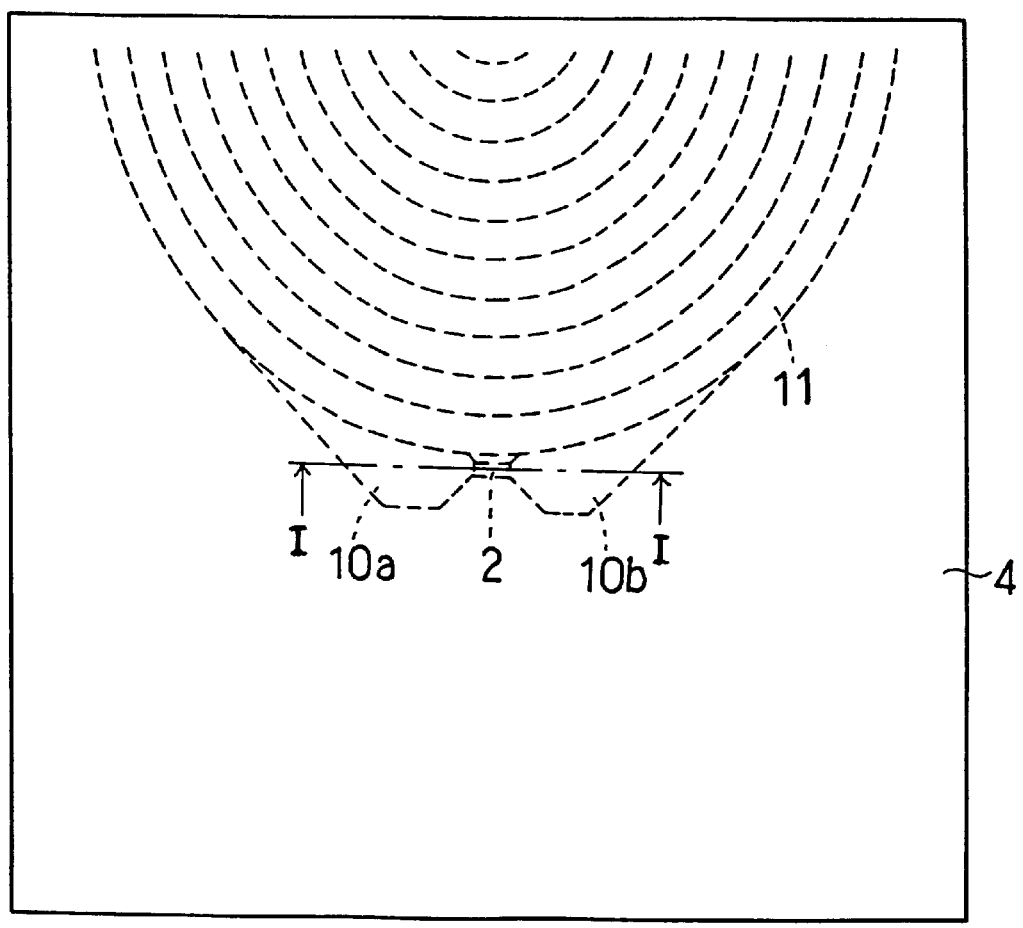
FIG. 3 is a schematic plan view showing a construction in the process of being fabricated in FIG. 1A.

FIG. 3 is a plan view showing the fabrication while the process shown in FIG. 1A is in progress. As shown in FIG. 3, provided on opposite sides of the MR film 2 are electrodes 10a and 10b for passing a detection current through the MR film 2. The gap layer 4 is underlaid with a coil 11 interposed between insulative layers comprised of cured organic material. This coil 11 is to be located between the merged core layer 3 and an upper core layer 7 which will be formed afterwards.

Referring to FIG. 1B, a resist layer 5 is then deposited on the gap layer 4 to cover a gap surface region which is more extensive than a localized gap surface region in which the upper core layer 7 is finally to be confined. Referring to FIG. 1C, $W_2$ denotes the localized region over the gap layer 4 in which the upper core layer 7 is finally to be confined, and $W_1$ denotes the region over the gap layer 4 which is to be left uncovered by an etching-protective layer 6 due to the presence of the resist layer 5. In this embodiment, the localized region $W_2$ has a width of 2.0 $\mu$m while the region $W_1$ has a width of 5.0 $\mu$m. Accordingly, the region $W_1$ extends 3.0 $\mu$m wider than the localized region $W_2$.

As illustrated in FIG. 1B, the resist layer 5 has a layered construction in which a second resist layer 5b is stacked on a first resist layer 5a. The first resist layer 5a is configured to have a cross-sectional area smaller than the second resist layer 5b. Such a construction serves to prevent the later applied etching-protective material from depositing around a lower side wall of the resist layer 5 to form ears which will remain as projected edges when the resist layer 5 is removed. Such a resist layer 5 having a two-layer structure can be fabricated by depositing the first resist layer 5a on the gap layer 4 and subsequently depositing the second resist layer 5b thereon utilizing a mask containing a slightly larger open pattern than used for the first.

Figure 4:
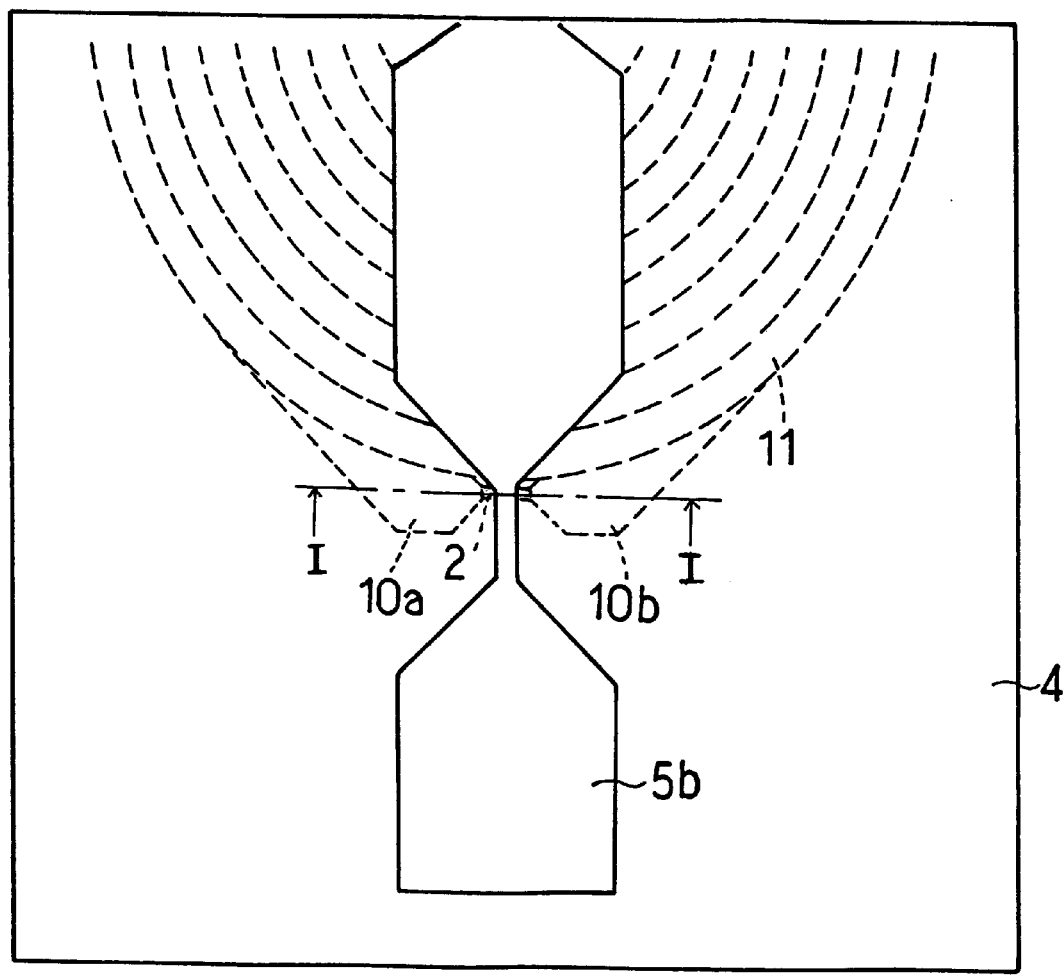
FIG. 4 is a schematic plan view showing a construction in the process of being fabricated in FIG. 1B.

FIG. 4 is a plan view showing a planar pattern of the resist layer 5a deposited. FIG. 1 shows a cross-section cut along the line I—I in FIG. 4.

FIG. 4 shows a planar pattern of the second resist layer 5b. The underlying first resist layer 5a (not shown) has a planar pattern slightly narrower than the second resist layer. Specifically, each side wall of the first resist layer 5a is spaced inwardly from a corresponding bottom side edge of the second resist layer 5b by a distance equal to the thickness of the etching-protective layer 6, i.e. the thickness of the first resist layer 5a. For example, if the desired thickness of the etching-protective layer 6 is 1 $\mu$m, the thickness of the first resist layer 5a is also set at 1 $\mu$m. Accordingly, the first resist layer 5a is patterned so that each side wall of the first resist layer 5a is spaced inwardly from the corresponding bottom side edge of the second resist layer 5b by a distance of 1 $\mu$m.

Alumina is sputtered onto the gap layer 4 with the resist layer 5 as shown in FIG. 1B to form the etching-protective alumina layer 6 shown in FIG. 1C. In this embodiment, the etching-protective alumina layer 6 is sputter formed to a film thickness of 1.0 $\mu$m. As shown in FIG. 1C, the etching-protective alumina layer 6 is deposited so as to leave the uncovered region $W_1$ more extensive than the localized region $W_2$ in which the upper core layer 7 is to be finally confined.

Next, as shown in FIG. 2D, the upper core layer 7 is deposited over the entire surfaces of the etching-protective layer 6 and the exposed portion of the gap layer 4 left uncovered. The upper core layer 7 is comprised of CoZr-based amorphous soft material having a high saturation magnetic flux density. In this particular embodiment, the upper core layer 7 is formed to a film thickness of 2.7 $\mu$m.

Another resist layer 8 is then deposited on the upper core layer 7, as shown in FIG. 2E, to cover a planar region corresponding to the localized region $W_2$ for the upper core layer 7. This resist layer 8 has a configuration analogous to the second resist layer 5b shown in FIG. 4. The resist layer 8 is initially configured slightly larger than a desired target size since it will be made thinner as its surface is gradually etched by ion beams which are incident at an oblique angle.

As shown in FIG. 2E, the upper core layer 7 is etched by an oblique incident ion beam 21 which is directed at an incident angle of 25° relative to a plane generally normal to the gap layer 4, while the resist layer 8 serves as a mask.

The oblique incident ion beam 21 is employed until approximately 93% of the film thickness of the upper core layer 7 is etched, and then it is switched to a perpendicular incident ion beam 22, which is directed or oriented at an incident angle of 0° relative to a plane generally normal to the gap layer 4, to etch and remove the remaining thickness i.e. approximately 7 percent of the upper core layer 7.

FIG. 2F shows the upper core layer 7 in the process of being etched for removal by the perpendicular incident ion beam 22 which now reaches at the surface of etching-protective layer 6.

Since the etching-protective layer 6 overlies the gap layer 4 in the present embodiment, the etching process can be controlled to terminate at a stage when the etching-protective layer 6 starts getting etched. The etching process accordingly comes to terminate before the merged core layer 3 is inadvertently etched, i.e. before it is damaged. This eliminates a risk of impairing the function of the merged core layer 3 as the upper shielding layer during the manufacture of the combined thin film magnetic head.

Also in this particular embodiment, since the oblique incident ion beam 21 is employed to etch and remove the majority of the upper core layer 7, redeposition of material etched from the upper core layer 7 onto the resist layer 8 is significantly suppressed. In FIG. 2F, a redeposition layer 9 is shown as being formed on a sidewall of the upper core layer 7 after completion of the etching process. This sidewall ear formation is considerably reduced when the present method is performed than when the perpendicular incident ion beam is employed successively from the start of the etching process to etch and remove the upper core layer 7. This eliminates the necessity of previously reducing the width of the resist layer 8 in consideration of its increment to be caused by redeposition of a large amount of etched material. It is therefore made possible to process the upper core layer 7 with increased precision and to provide a reduced track width for the recording head part than could be achieved conventionally.

Also in this particular embodiment, since the oblique incident ion beam 21 is switched to the perpendicular incident ion beam 22 at a final stage of the etching precess, the upper core layer 7 can be etched to a desired pattern throughout its thickness. This provides etching with substantially no undercuts which would be caused if the oblique incident ion beam is successively employed till the end of the etching process.

Also in this particular embodiment, since the etching-protective layer 6 is deposited so as to leave the uncovered region $W_1$ wider than the localized region $W_2$ in which the upper core layer 7 is to be finally confined, the etching-protective layer 6 is prevented from intervening between the gap layer 4 and a portion of the upper core layer 7 which will remain unetched after the succeeding processes, as illustrated in FIG. 2F. Therefore, a width of a gap defined between the upper core layer 7 and the merged core layer 3 can be controlled at a target value as initially designed.

Also, the etching-protective layer 6 further serves to prevent the coil 11 formed in a region shown in FIGS. 3 and 4 from being damagingly etched.

FIGS. 5A–5C, 6D–6F, 7G–7I and 8J–8L are cross-sectional views showing another exemplary series of processes embodying the method for fabricating the combined thin film magnetic head in accordance with the present invention.

Figure 5A:
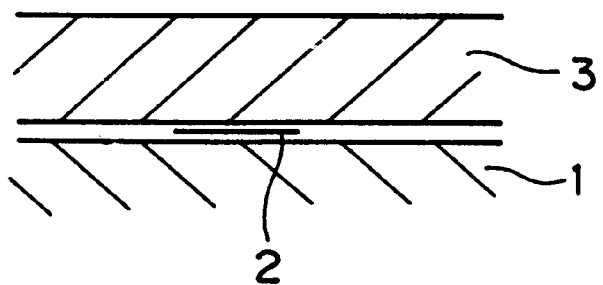
FIGS. 5A–5C are schematic cross-sectional views respectively showing fabricating processes in accordance with a second embodiment of the present invention.

Referring to FIG. 5A, an MR reproduction or read head part is constructed by interposing an MR film 2 between a lower shielding layer 1 and a merged core layer 3, in the same manner as in the embodiment shown in FIG. 1A. Again in this embodiment, the lower shielding layer 1 and the merged core layer 3 are comprised of NiFe (permalloy).

Figure 5B:
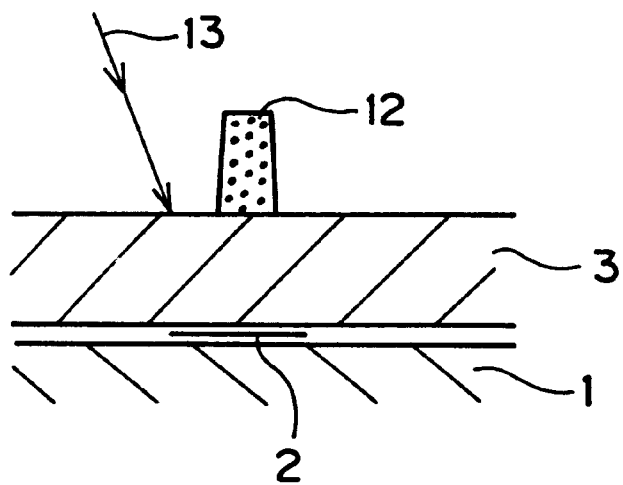

Referring to FIG. 5B, in the fabricating processes of the present embodiment, the formation of the merged core layer 3 is succeeded by formation of a resist layer 12 thereon. The resist layer 12 is deposited on the merged core layer 3 to extend over a merged core surface region corresponding to a localized region in which the upper core layer 7 is to be finally confined in the process as hereinafter described. Next, the merged core layer 3 is etched by an oblique incident ion beam 13 which is directed to be incident at an incident angle of 25° relative to a plane generally normal to the merged core layer 3, while the resist layer 12 serves as a mask.

Although the oblique incident ion beam is employed in the present embodiment this is not a limiting feature and a perpendicular incident ion beam can also be employed for the etching purpose.

Figure 5C:
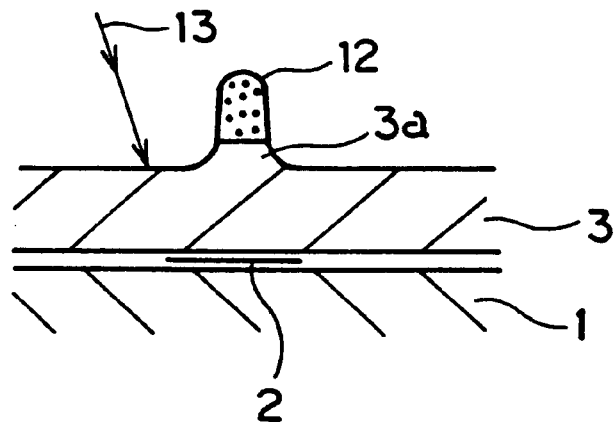
Figure 6D:
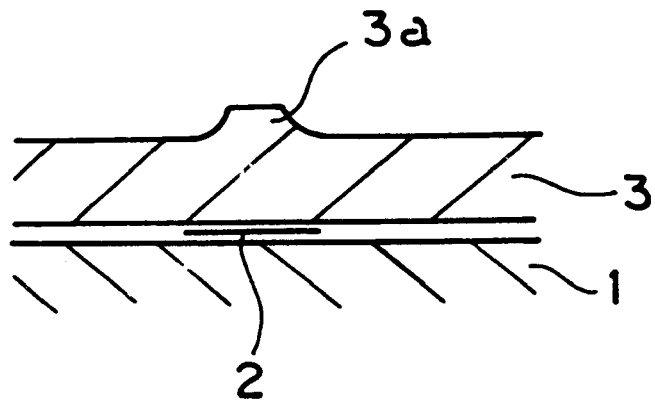
FIGS. 6D–6F are schematic cross-sectional views respectively showing further fabricating processes in accordance with the second embodiment of the present invention.

Referring to FIG. 5C, the merged core layer 3 is etched to be removed from the exposed region left uncovered by the resist layer 12, so that the unetched portion thereof remains as an elevated portion 3a beneath the resist layer 12. The merged core layer 3 after removal of the resist layer 12 is shown in FIG. 6D.

The region in which the resist layer 12 is formed is narrower than the localized region for the upper core layer, and the elevated portion 3a is formed in the narrower region as compared to the localized region for the upper core layer.

Figure 6E:
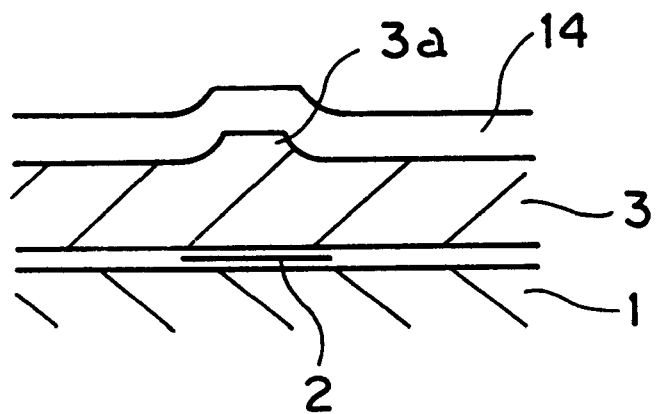
Figure 6F:
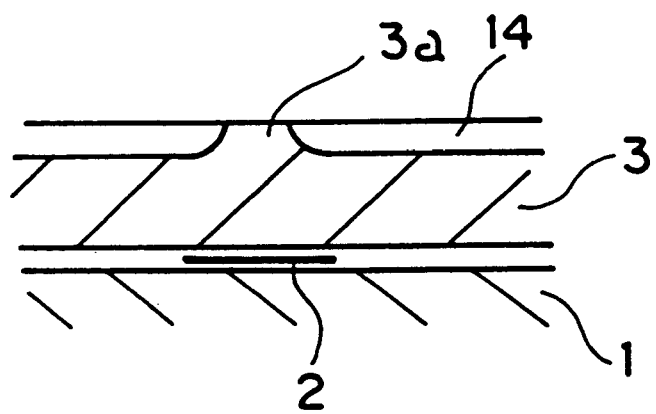

Referring to FIG. 6E, an insulative layer 14 of nonmagnetic material such as alumina is formed on the merged core layer 3. The insulative layer 14 must be thick enough to bring its surface in an elevation not lower than a top surface of the elevated portion 3a. The surface of the insulative layer 14 is then polished so that the entire surfaces of the elevated portion 3a and the insulative layer 14 are levelled to flat while the elevated portion 3a of the merged core layer 3 is at its top surface exposed to the exterior.

Figure 7G:
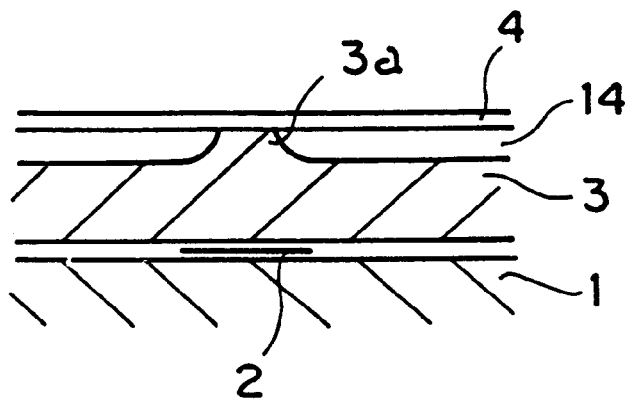
FIGS. 7G–7I are schematic cross-sectional views respectively showing fabricating processes in accordance with the second embodiment of the present invention.

With reference to FIG. 7G, an alumina gap layer 4 (of 0.3–0.4 μm film thickness) is deposited over entire flat surfaces of the elevated portion 3a of the merged core layer 3 and the insulative layer 14 to constitute a gap for the inductive recording head part.

Formation of an etching-protective layer 6, as well as formation of the upper core layer 7 in the localized region, are carried out in the succeeding processes, in the same manner as explained above with reference to FIGS. 1B, 1C and 2D–2F. The fabricating processes will be now explained.

Figure 7H:
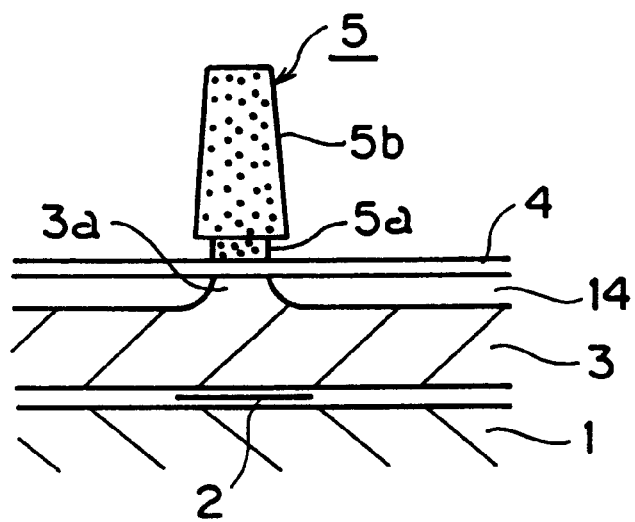
Figure 7I:
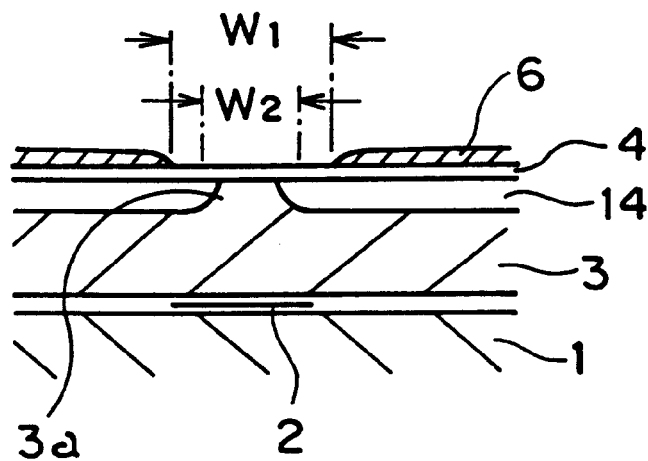

Referring to FIG. 7H, a resist layer 5 is deposited on the gap layer 4 to cover a gap surface region which is more extensive than the localized region in which the upper core layer 7 is to be finally confined. The resist layer 5 is constructed by stacking a second resist layer 5b on a first resist layer 5a. In this embodiment, the first resist layer 5a is configured to have a cross-sectional area smaller than the second resist layer 5b. An alumina film is deposited on the gap layer 4 using the resist layer 5 as a mask to define the etching-protective layer 6 on the gap layer 4. The etching-protective layer 6, subsequent to removal of the resist layer 5, is shown in FIG. 7I. This etching-protective layer 6 corresponds to that shown in FIG. 1C, and is accordingly defined to leave an exposed or uncovered region $W_1$ wider than the localized region $W_2$ for the upper core layer 7.

Figure 8J:
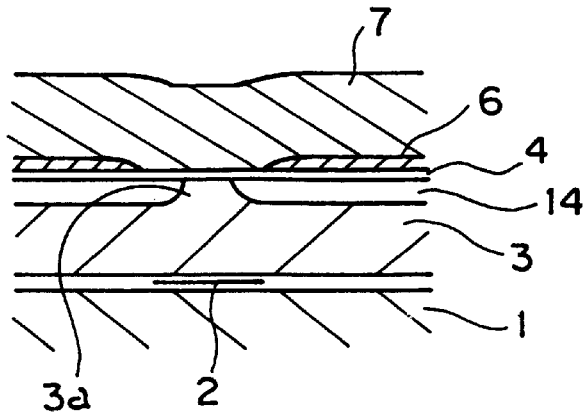
FIGS. 8J–8L are schematic cross-sectional views respectively showing fabricating processes in accordance with the second embodiment of the present invention.

Then, FIG. 8J shows the upper core layer 7 in the process of being deposited over the entire surfaces of the etching-protective layer 6 and the gap layer 4 portion left uncovered by the etching-protective layer 6.

Figure 8K:
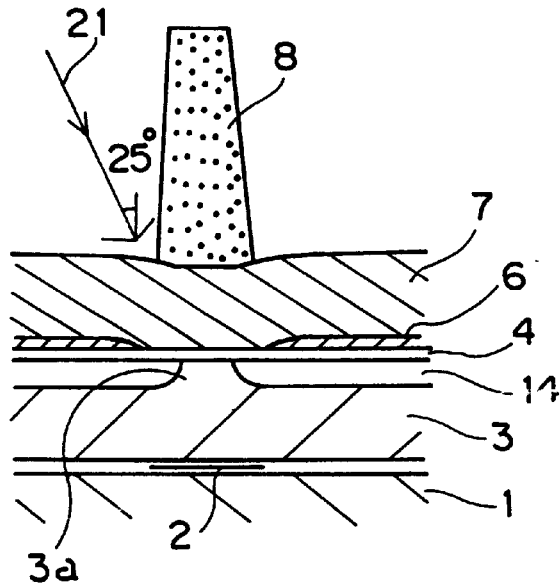

As shown in FIG. 8K, a resist layer 8 is then deposited on the upper core layer 7 to extend over a region corresponding to the localized region $W_2$ for the upper core layer 7.

Next, the upper core layer 7 is etched by an oblique incident ion beam 21 which is directed to be incident at an incident angle of 25° relative to a plane generally normal to the gap layer 4, while the resist layer 8 serves as a mask. The oblique incident ion beam 21 is switched to a perpendicular incident ion beam 22 in the middle course of etching, as similarly to the embodiment explained above with reference to FIG. 2E, to etch and remove the remaining fraction of the upper core layer 7.

Figure 8L:
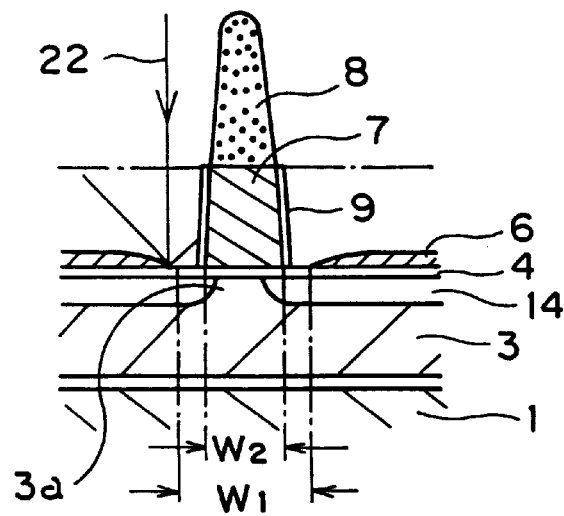

FIG. 8L shows the upper core layer 7 in the process of being etched so as to be removed by the perpendicular incident ion beam 22 which finally reaches at a surface of the etching-protective layer 6. The resist layer 8 is then removed, and thereafter the conventionally employed processes succeed to fabricate a combined thin film magnetic head.

In this particular embodiment, the elevated portion 3a of the merged core layer 3 is located beneath the upper core layer 7. This serves to suppress a magnetic flux leakage so that the magnetic flux can be concentrated in a region corresponding to a track width.

In accordance with the fabricating method of the present invention, the etching-protective layer is deposited over the gap layer as to provide the exposed region left uncovered that is wider than the localized region for the upper core layer 7. This enables controlling the etching process as being terminated at a point when the etching-protective layer 6 starts getting etched. The etching process accordingly comes to terminate before the merged core layer 3 is etched. This eliminates a risk of impairing the function of the merged core layer 3 as the upper shielding layer during the fabrication of the combined thin film magnetic head. Also in the present invention, the provision of the etching-protective layer prevents the coil from being damagingly etched.

Also, since the etching-protective layer is deposited over the gap layer as to provide the exposed region left uncovered which is wider than the localized region for the upper core layer 7, the etching-protective layer 6 is restrained from penetrating in a gap defined between the upper core layer and the merged core layer. Therefore, the gap for the recording head can be precisely defined.

Also, in accordance with one preferred embodiment of the present invention, the oblique incident ion beam 21 is employed at the initial stage of etching process, and is switched to the perpendicular incident ion beam at the final stage of etching process. This essentially prevents the etched material from redepositing onto the resist layer and the others, thus eliminating the necessity of taking into account the increment in width of the resist layer which will result from the redeposition. Therefore, the etching process can be carried out with increased precision as compared to the conventional process. This enables provision of a narrowed track gap for the recording part, so that the higher density recording becomes attainable.

What is claimed is:

1. A method for fabricating a combined thin film magnetic head which includes a magnetoresistive reproducing head part and an inductive recording head part, wherein the magnetoresistive reproducing head part is defined between a lower shielding layer and a merged core layer, and wherein the inductive recording head part is defined between the merged core layer and an upper core layer and is configured to specify a track width for the recording head part by providing the upper core layer in a localized region, the method comprising the steps of:

forming the merged core layer to include an elevated portion of the merged core layer in a region corresponding to the localized region in which the upper core layer is to be finally confined;

forming an insulative layer on the merged core layer to bring a surface of the insulative layer into general alignment with a surface of the elevated portion;

depositing a gap layer over entire surfaces of the elevated portion of the merged core layer and the insulative layer for constituting a gap for the inductive recording head part;

forming an etching-protective layer on the gap layer to provide an exposed region of the gap layer left uncovered by the etching-protective layer which is more extensive than the localized region;

depositing the upper core layer over entire surfaces of the etching-protective layer and the exposed region of the gap layer left uncovered by the etching-protection layer; and etching through the upper core layer outside the localized region to finally reach a surface of the etching-protective layer and to finally confine the etched upper core layer in the localized region for defining a desired track width for the combined thin film magnetic head.

2. The method for fabricating a combined thin film magnetic head of claim 1, wherein the etching in the etching step is carried out with an oblique incident ion beam in an initial stage of said etching and with a perpendicular incident ion beam in a final stage of said etching.

3. The method for fabricating a combined thin film magnetic head of claim 2, wherein the oblique incident ion beam is oriented at an incident angle of 20°–30° relative to a plane generally normal to the gap layer.

4. The method for fabricating a combined thin film magnetic head of claim 2, wherein the etching carried out with the oblique incident ion beam in the initial stage is switched to the etching carried out with the perpendicular incident ion beam in the final stage when 80%–95% of the thickness of the upper core layer has been etched away.

5. The method for fabricating a combined thin film magnetic head of claim 1, wherein in the step of forming the etching-protective layer, the exposed region of the gap layer left uncovered by the etching-protective layer is 0.2 $\mu$m–3.0 $\mu$m wider than the localized region.

6. The method for fabricating a combined thin film magnetic head of claim 1, wherein in the step of forming the etching-protective layer, the etching-protective layer is formed to a thickness of 1.0 $\mu$m–2.0 $\mu$m.

7. The method for fabricating a combined thin film magnetic head of claim 1, wherein the step of forming the merged core layer including the elevated portion includes the steps of:

forming a merged core precursor layer;

forming a resist layer on the merged core precursor layer to extend over a first region corresponding to the localized region in which the upper core layer is to be finally confined and to leave a second region uncovered by the resist layer; and etching the merged core precursor layer in the second region left uncovered by the resist layer while using the resist layer as a mask, thereby forming said merged core layer.

8. The method for fabricating a combined thin film magnetic head of claim 1, wherein the step of forming the etching-protective layer includes the steps of:

forming a second resist layer on the gap layer in the exposed region which is more extensive than the localized region;

selectively forming the etching-protective layer on the gap layer outside the exposed region while using the second resist layer as a mask; and removing the second resist layer subsequent to the selective formation of the etching-protective layer.

9. The method for fabricating a combined thin film magnetic head of claim 8, wherein the second resist layer has a layered structure including at least upper and lower layers.

10. The method for fabricating a combined thin film magnetic head of claim 9, wherein the lower layer has a smaller cross-sectional area than the upper layer.

11. The method for fabricating a combined thin film magnetic head of claim 1, wherein the step of etching through the upper core layer does not etch any of the merged core layer.

12. The method for fabricating a combined thin film magnetic head of claim 1, wherein said etching-protective layer comprises at least one of alumina, diamond-like carbon, silicon carbide, and boron nitride.

13. The method for fabricating a combined thin film magnetic head of claim 1, wherein said upper core layer is deposited directly on and in contact with the exposed region of the gap layer, said etching-protective layer is formed directly on and in contact with the gap layer away from the exposed region, and the gap layer is deposited directly on and in contact with the elevated portion of the merged core layer.

14. A method of fabricating a combined thin film magnetic head that includes a magnetoresistive reproducing head part and an inductive recording head part, said method comprising the following steps:

a) forming a merged core layer to include a main layer portion and an elevated portion protruding above said main layer portion in a first region of said merged core layer;

b) forming an insulative layer on said merged core layer so that said insulative layer covers said main layer portion of said merged core layer and so that a surface of said insulative layer is generally flush with a surface of said elevated portion of said merged core layer;

c) depositing a gap layer over said surface of said insulative layer and said surface of said elevated portion;

d) forming an etching-protective layer on a covered region of said gap layer and leaving an exposed region of said gap layer uncovered by said etching-protective layer;

e) depositing an upper core layer over said etching-protective layer and said exposed region of said gap layer; and f) etching away said upper core layer in an area outside of a localized region so as to leave a remaining portion of said upper core layer confined to said localized region;

wherein said localized region and said first region respectively have corresponding locations on opposite sides of said gap layer, and said exposed region has a larger area than said localized region.

* * * * *